Patented Nov. 13, 1928.

1,691,271

UNITED STATES PATENT OFFICE.

CARLETON ELLIS, OF MONTCLAIR, NEW JERSEY.

RESINOUS MATERIAL AND PROCESS OF MAKING SAME.

No Drawing.  Application filed November 28, 1924. Serial No. 752,811.

This invention relates to resinous material and to the process of making same and relates especially to (A) utilization of low grade or off-grade phenolic and phenoloid substances such as xylenols, creosotes etc. and (B) carrying out the reaction of making such resins without the necessity of applying external heat thereby to secure a specific orienting effect and control of the reaction.

As phenolic and phenoloid substances and bodies of related character I may use ordinary carbolic acid or phenol, also ortho, meta and para cresols, xylenols, either separately or in admixture especially in the form found in commerce as a fraction boiling between 206 and 230° C. Furthermore I may use the crude oils obtained by extraction of coal tar with alkali and subsequent acidification of the alkaline extract which results in a product containing some phenol and usually larger amounts of the cresols and xylenols. One object of the invention in its preferred form is to avoid the use of phenol or any substantial amount of cresol and rather to employ the much cheaper low grade phenoloid substances. However the invention does not preclude the use of phenol or cresols including the refined mixture known as metaparacresol.

An aldehyde substance is used to react with such phenoloid material and I may employ for the purpose formaldehyde in the commercial aqueous form containing about 37 to 40 per cent of actual formaldehyde. The polymers of formaldehyde such as paraform may be used. The invention does not preclude the use of other aldehydes with or without formaldehyde including for example acetaldehyde and paraldehyde, acrolein, furfural, butyl aldehyde, benzaldehyde etc. The invention however will be illustrated by the use of ordinary aqueous formaldehyde.

Resinification preferably is carried out through the agency of a basic substance preferably of a filler-making character. It is well known that caustic soda has been proposed as a basic catalyst, see for example patents by Baekeland and others. It has the disadvantage however that it tends to react with a filler such as ground wood or wood flour with the danger that the fibre may be disintegrated through formation of hydrocellulose or other products of decomposition of cellulose. The caustic soda material on exposure is likely to cause the molded article to become coated with a film of moisture in damp weather due to absorption by the carbonate of soda which forms in and on the surface. The alkaline earths such as calcium and barium oxide or hydrates are liable to have some effect on the fibre but they have the advantage of forming an insoluble carbonate on exposure and which serves as a filler-making material. Magnesium oxide serves as a very effective base having no disintegrating action on fibrous fillers and bringing about the reaction of resinification in a desirable and well controlled manner. In employing bases such as caustic soda it has been proposed to use these in very small proportion so as to secure simply a catalytic effect. Even with such small proportions the dielectric qualities are reduced and the effect of such a strong alkali permeating the entire molded article is disadvantageous. This applies even when less than one-fifth of a mol. of caustic soda or caustic potash is used to one mol. of phenol. On the other hand magnesium oxide or hydrate may be employed in full molecular proportion or even in double molecular proportion to form the equivalent of magnesium phenate or phenolate, cresylate, xylenate or their basic compounds.

Although I prefer to use a full molecular proportion of magnesium oxide in bringing about the reaction I do not wish to be limited to proportions substantially greater than what may be termed catalytic proportions but may employ the magnesium compound under some circumstances in proportions less than one-fifth of a mol. While therefore the invention does not preclude the use of catalytic proportions of less than one-fifth of a mol. I prefer to secure the advantages of using the magnesium oxide in much greater proportions thereby securing the peculiar properties of what may be termed the magnesium phenate resins. If used in molecular proportions, that is one mol. to a mol. of phenol, cresol, xylenol and the like in the presence of approximately a mol. of formaldehyde and heating the mixture in the manner that is usually described in the art the reaction is very violent as it is strongly exothermic and in making large quantities of the material would be difficult to control.

The violent reaction is an indication that the product will be quick-curing, that is it will harden rapidly when hot pressed. This is of advantage as it reduces the labor cost of molding. On the other hand curing should not be too rapid since the resin otherwise may not have time to flow throughout the mold and make a sharp impression. Also if it cures too rapidly it becomes too hard in the mold and there is danger of breakage in removing thin irregular shaped articles from the mold. At the temperature of the molding press when the cure is complete the article should be slightly rubbery so that it may be withdrawn from the mold, especially a complicated one, without danger of breakage.

A feature of the present process in its preferred form is that of preparation of the resin and molding mixture or composition in the cold, that is preferably at room temperature. The method which I shall describe does not preclude cooling if necessary in hot weather and warming slightly in cold weather. As a general procedure however I have been able to make molding composition without applying any external heat thus eliminating vacuum dryers and a large amount of equipment now employed for the purpose. My invention reduces to simplest terms the preparation of such material.

1. Preparation of magnesium material. The magnesium oxide or hydrate employed may be added to the phenolic body, preferably being ground in it, or it may be added to the formaldehyde solution and ground. The latter is preferable as magnesium oxide when ground in this manner undergoes some reaction with the formaldehyde solution making what may be termed an aldehyde jelly. In the proportions of say one mol. each of magnesium oxide and formaldehyde intended to be mixed with one mol. of the phenolic substance it will be observed that the thin solution of the magnesium oxide and 40 per cent aqueous formaldehyde changes in consistency on grinding in a ball mill and after the ground material has stood for a time a white paste or jelly results which material is preferably used in carrying out the present invention.

2. This magnesium aldehyde jelly is mixed with xylenol or other phenoloid substance the mixture preferably being in the proportion of one mol. each of the reacting constituents. The magnesium aldehyde jelly may be added to the xylenol with slow stirring at room temperature and preferably brine in an amount twice the volume of the aqueous formaldehyde originally employed is added. The mixture is maintained in slow agitation for 24 to 48 hours or until any simple test, such as the fuchsine test, shows the formaldehyde is combined.

3. The water or brine solution which now has separated may be decanted or drained off.

4. The resinous material at this stage may contain 4 or 5 per cent of water. It can be dried by exposure to heat for example in a vacuum pan or in a shelf dryer under atmospheric pressure. Since such drying is troublesome and expensive and since it is an object to make the resin as economically as possible I have found that the residual water may be eliminated as such by the use of drying agents such as ground quick lime or powdered plaster of Paris or mixtures of quick lime and plaster of Paris. For many purposes it suffices simply to add enough plaster of Paris to absorb the residual water and the hydrated calcium sulphate which forms serves as a filler.

5. Ordinarily the resinous material is incorporated with fillers such as ground wood or wood flour, sawdust, linters, flock, asbestos and various mineral fillers such as clay, whiting and the like. When calcium sulphate is employed as a drying agent I preferably employ wood flour as the major filler.

6. Pigments and various coloring agents may be added and also a mold lubricant such as aluminum palmitate, zinc stearate or stearic acid. Fatty acids such as oleic, palmitic and stearic acids will combine to some extent with lime or lime and magnesia when both of these substances are present to yield a mold lubricant. The addition of hexamethylenetetramine is not precluded but usually is not necessary and since it is relatively expensive is not recommended for most purposes.

The steps 4, 5 and 6 may be combined by introducing all the ingredients required into a ball mill and grinding together or the calcium sulphate or other drying agent may be first ground with the wood flour and the resin subsequently added. In some cases mixing may be carried out in a Werner-Pfleiderer mixer which may be jacketed so that hot or cold water may be used if required.

The simplest procedure is that of mixing the phenolid substance and magnesium aldehyde jelly in the cold and when reaction is complete drain off the water and put the mixture in a ball mill with the dryer, filler, coloring agent and lubricant and grind together until well mixed. The composition then is ready for molding. It will thus be seen that the operation is simple and cheap and that little apparatus is required. Made in this manner the surface finish of the molded article is not as brilliant as is obtained when the mixture is dried under vacuo. However the surface finish is usually substantially better than that obtained from ordinary cold molded stock made with asphalt and the like and is very much stronger. The usual cold molded material made with asphalt is weak and very easily broken and in the present invention it is an object to secure a product which has a surface finish as good as such cold molded material and preferably better, which does not however necessarily have high dielectric strength but which mechanically is strong and tough in comparison with said cold molded material. The latter as a rule does not possess a high degree of electrical resistance but has a wide use for purposes where house current of 110 to 220 volts is used and for such purposes I propose the application of the products prepared within the range of my invention.

There are various modifications in carrying out the invention and in its exemplification by the following illustrative procedures I do not wish to limit myself in any manner. With the illustrations herein set forth numerous modifications or deviations will now be obvious to those skilled in the art.

*Example 1.*—100 parts by weight of ordinary commercial coal tar acids containing about 8 per cent of phenol, 65 per cent of ortho cresol and 27 parts of metaparacresol were mixed with 120 parts of ground magnesium-formaldehyde mixture prepared by grinding in pebble mill 30 parts of calcined magnesium oxide and 150 parts of aqueous 40 per cent formaldehyde solution. 200 parts of saturated brine were added to this mixture and the whole was allowed to stand in the cold with slow agitation until all formaldehyde was consumed. The end of the reaction was determined by fuchsine reagent, considering the end point when coloration did not appear within 30 seconds after addition of the reagent to a sample of water layer. When the reaction was terminated the water layer was decanted and 100 parts of residual resinous mass (containing about 8 per cent of water) were thoroughly mixed with 54 parts of powdered plaster of Paris. The resin, thus dehydrated, was mixed in pebble mill with 100 parts of wood flour containing 2 parts of aluminum palmitate and 2 parts of carbon black.

*Example 2.*—100 parts of resin described in Example 1 and containing 8 per cent of residual water were placed in pebble mill simultaneously with 54 parts of plaster of Paris, 100 parts of wood flour, 2 parts of aluminum palmitate and 2 parts of carbon black and the whole ground for 3 hours.

*Example 3.*—122 parts of crude xylenol tar acid containing 50 per cent of bodies with boiling point above 212° C. were mixed with 120 parts of ground magnesium-formaldehyde mixture prepared as described in Example 1 and with 300 parts of saturated brine solution. The mixture was allowed to stand in the cold with slow agitation for 48 hours until all formaldehyde was consumed which was indicated by the absence of coloration with fuchsine reagent within 30 seconds. The water layer was separated from the resin by filtration. 300 parts of this resin containing 9 per cent of residual water were first crushed and then intimately mixed with 54 parts of plaster of Paris. The dehydrated resin was placed in a Werner-Pfleiderer mixer with 300 parts of wood flour, and the batch agitated for 3 hours. The composition was allowed to stand at room temperature over night and finally was ground in pebble mill for 2 hours with 10 parts of aluminum palmitate and 10 parts of pigment.

What I claim is:—

1. The process which comprises reacting together a crude xylenol and a magnesium formaldehyde jelly, agitating at room temperature until the formaldehyde has combined, and separating out the water.

2. The process which comprises reacting together a crude xylenol and a magnesium formaldehyde jelly while agitating at room temperature until combination has taken place, separating out the water, and intimately mixing the dehydrated material with a filter.

3. A molding composition comprising a thermo-setting resin derived from xylenol, magnesium oxide and formaldehyde.

4. A magnesium xylenate resin composition.

5. A magnesium xylenate resin heat-setting molding composition.

6. The process of making a molding composition which comprises reacting on a fraction containing a predominating amount of xylenols with a ground mixture of magnesium oxide in formaldehyde, heating and permitting the reaction to continue until formaldehyde substantially disappears, drying and incorporating with a filler.

7. The process of making a molding composition which comprises reacting on a fraction containing a predominating amount of xylenols with a ground mixture of magnesium oxide in formaldehyde, heating and permitting the reaction to continue until formaldehyde substantially disappears, drying and grinding with a filler comprising wood flour.

8. The process of making a molding composition which comprises reacting on a fraction containing a predominating amount of xylenols with a ground mixture of magnesium hydroxide in formaldehyde, heating and permitting the reaction to continue until formaldehyde substantially disappears, drying and incorporating with a filler.

9. The process of making a molding composition which comprises reacting on a fraction containing a predominating amount of xylenols with a ground mixture of magnesium hydroxide in formaldehyde, heating and permitting the reaction to continue until formaldehyde substantially disappears, drying and grinding with a filler comprising wood flour.

CARLETON ELLIS.

CERTIFICATE OF CORRECTION.

Patent No. 1,691,271.            Granted November 13, 1928, to

CARLETON ELLIS.

It is hereby certified that error appears in the printed specification of the above numbered patent requiring correction as follows: Page 3, line 103, claim 2, for the word "filter" read "filler"; and that the said Letters Patent should be read with this correction therein that the same may conform to the record of the case in the Patent Office.

Signed and sealed this 8th day of January, A. D. 1929.

M. J. Moore,
Acting Commissioner of Patents.

(Seal)